3,006,874
THERMOSETTING LIGNIN CONTAINING RESIN

Emile A. Cambron, Cornwall, Ontario, Canada, assignor to Howard Smith Paper Mills Limited, Montreal, Quebec, Canada
No Drawing. Filed Oct. 24, 1958, Ser. No. 769,281
2 Claims. (Cl. 260—17.5)

The purpose of this invention is to prepare a new and valuable thermosetting lignin containing resin.

It is a further object of this invention to prepare a resin containing substantial amounts of lignin which can be used for the production of thermosetting laminates which show good bonding, good flexural strength and good resistance to water absorption.

I have discovered that acetone, together with phenol and formaldehyde, can, under rigidly controlled conditions, lead to a valuable thermosetting resin having high flexibility, good bonding strength, and good water absorption as more particularly described in my co-pending Canadian application Serial No. 755,640, filed July 24th, 1958. I have now found that alkali lignin is soluble in resins of the type produced in accordance with the invention set forth in my said co-pending application, and that by incorporating lignin in such resins together with the phenol, or at some later stage, I am able to improve further the resistance to water absorption and retain all of the desired mechanical properties while considerably reducing the cost.

It is known to the art that acetone will react with formaldehyde to form methylol derivatives of acetone which will further undergo polymerization leading to thermoplastic low molecular weight polymers.

An example of acetone formaldehyde polymerization is as follows:

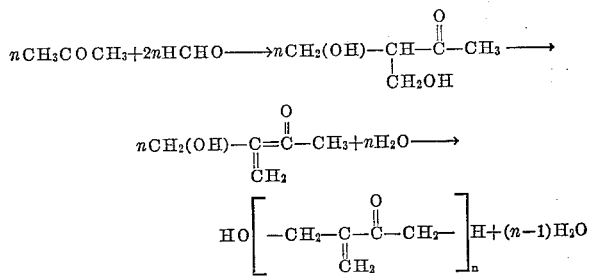

In addition to $n$ moles of acetone reacting with $2n$ moles of formaldehyde as shown in the above reaction, $n$ moles of acetone will also react either with $n$ moles or with 3 moles of formaldehyde, leading to resin formation. These polymers have poor mechanical properties and poor heat resistance.

It has been suggested that phenol or a phenolic resin be added to these polymers to attain better heat stability. However, results obtained with these resins, although to some extent heat hardenable, are not truly thermosetting. Thus, if such a resin is used in paper or cloth based laminates, the resulting products when drawn hot from the press, blister and delaminate as a result of the rapid escape of water vapor from the still soft material. These resins have not been found to be commercially acceptable.

As set forth in my said co-pending application I have found that phenol or cresols or mixtures thereof can be introduced into the reaction, to form a copolymer at the stage where the methylol derivatives of acetone are substantially in the monomeric form.

Due to the greater reactivity of the alpha-hydrogen of the phenol molecule over the alpha-hydrogen of the acetone molecule, the formation of acetone-formaldehyde polymers may be minimized by adding the phenol with acetone.

However, the further the reaction between the acetone and formaldehyde is carried out before the addition of the phenol, the higher the yield. However, if the phenol is added at the beginning, the formaldehyde preferentially reacts with phenol, and much of the acetone remains unreacted, thus reducing the yield, due again to the difference in the reactivity of their hydrogen atoms. The best yields of a satisfactory resin are obtained by initiating the reaction between acetone and formaldehyde to yield a substantially monomeric product under mildly alkaline conditions and then introducing phenol which may be equimolecularly proportioned to the acetone, before the substantially monomeric product has polymerized into the undesired inferior quality acetone formaldehyde monomer and then more formaldehyde is added and the solution is refluxed to produced a thermosetting resin. The lignin is then dissolved in the resin, or alternatively it may be added with the phenol at an early stage.

Example 1

The following materials were used in preparing a water dilutable laminating resin.

| | Moles |
|---|---|
| 581 gm. acetone | 10.00 |
| 831 gm. phenol | 8.85 |
| 2960 gm. 37% formaldehyde | 36.60 |
| 19.0 gm. sodium carbonate (anhydrous) | 0.18 |
| 1435 gm. alkali lignin (air dry) (assumed molecular weight 924) | 1.55 |
| 22 gm. sodium hydroxide | 0.55 |
| 1600 gm. methanol | 50.0 |
| 44 gm. water | 2.44 |

The acetone is introduced into a reaction vessel fitted with an agitator and a reflux condenser. The acetone is brought to reflux and 1020 gm. of formaldehyde (12.60 moles) and 2.66 gm. sodium carbonate (0.025 mole) are gradually added separately such that 10 equal portions of each are added at 10 minute intervals.

After an additional 10 minute reflux following the tenth addition of formaldehyde 831 gm. of phenol and 2.66 gm. of sodium carbonate (0.025 mole) are added and the resultant solution is refluxed for 30 minutes.

This is followed by 1020 gm. of formaldehyde (12.60 moles) and 6.10 gm. of sodium carbonate (0.057 mole) which are gradually added separately such that 5 equal portions of each could be added at 10 minute intervals. Further formaldehyde 920 gm. (11.40 moles) and sodium carbonate, 7.6 gm. (0.073 mole) are added and the resultant solution is refluxed for a period of 75 minutes. The resin is then cooled to 50° C. and half the lignin added together with 10 gm. of sodium hydroxide (0.275 mole) dissolved in 20 gm. of water (1.22 moles) and all of the methanol. After solution, the remainder of the lignin and sodium hydroxide dissolved in 20 gm. water (1.22 moles) are added and the lignin allowed to dissolve.

The resin will then have a viscosity of 30 to 35 centistokes and non-volatile solids of 41.5 to 42.5 at a pH of 6.5 to 7.0. This resin was used for impregnating 60 lb. kraft paper (basis 3,000 sq. ft.) to a resin content of 32.4% and a volatile content of 7.7% and the resultant material laminated by pressing for forty-five minutes at 160° C. under 800 p.s.i. with the following results.

Water absorption of predried samples during 24 hours immersion in distilled water (A.S.T.M. D570–54T) percent:

| | |
|---|---|
| ⅛″ | 0.94 |
| ½″ | 0.60 |

Tensile strength (p.s.i.):

| | |
|---|---|
| M.D. | 23,000 |
| C.D. | 18,300 |

Flexural strength (p.s.i.):
- M.D. ............................................. 26,000
- C.D. ............................................. 20,200

M. of E. flex. (p.s.i.×10⁶):
- M.D. ............................................. 2.01
- C.D. ............................................. 1.68

Compression strength flat (p.s.i.) ............... 37,200

Impact Izod (ft. lb./in. notch):
- M.D. ............................................. 0.51
- C.D. ............................................. 0.45

Bonding strength, lbs. (A.S.T.M. D229–49) steel ball 0.315 in. ............................................. 840

Heat resistance:
The material can be drawn hot from the press (160° C.) without blisters. Shows no surface injury and no blistering when subjected to A.S.T.M. (D1300–53T) high-temperature test.

*Example II*

The following materials were used in preparing an alcohol soluble laminating varnish.

| | | Moles |
|---|---|---|
| 581 gm. acetone | | 10.00 |
| 581 gm. phenol | | 6.18 |
| 250 gm. cresol (55–60% meta) | | 2.32 |
| | | 8.50 |
| 3060 gm. 37% formaldehyde | | 37.80 |
| 26.6 gm. sodium carbonate anhydrous | | 0.25 |
| 1470 gm. alkali lignin (assumed molecular weight 924) | | 1.59 |
| 2735 gm. methyl alcohol | | 85.3 |
| 36 gm. sodium hydroxide | | 0.90 |
| 72 gm. water | | 4.00 |

The acetone (10 moles) is introduced into a reaction vessel fitted with an agitator and a reflux condenser. The acetone is brought to reflux and 1020 gm. of formaldehyde (12.60 moles) and 2.66 gm. of sodium carbonate (0.025 mole) are gradually added separately such that 10 equal portions of each are added at 10 minute intervals.

After an additional 10 minutes reflux following the tenth addition of formaldehyde 581 gm. phenol, 250 gm. cresol and 2.66 gm. (0.025 mole) of sodium carbonate are added and the resultant solution is refluxed for 30 minutes.

This is followed by 1020 gm. of formaldehyde (12.60 moles) and 6.10 gm. of sodium carbonate (0.057 mole) which are gradually added separately such that 5 equal portions of each are added at 10 minute intervals. Further formaldehyde, 1020 gm. (12.60 moles) and catalyst, 7.59 gm. of sodium carbonate (0.072 mole) are then added and reflux carried for a period of 60 minutes. An additional 7.59 gm. of sodium carbonate (0.072 mole) is then added and the resultant solution is refluxed for 20 minutes.

The resin is then distilled under high vacuum to a temperature of 85° C. After the water has been removed, 2735 gm. methyl alcohol are added followed by 1470 gm. of alkali lignin and 36 gm. of sodium hydroxide dissolved in 60 gm. of water, giving a dark viscose laminating varnish suitable for the production of high quality thermosetting paper or cloth laminates.

This resin was used for impregnating 80 lb. kraft paper (basis 3,000 sq. ft.) to a resin content of 31.9% and a volatile content of 5.8% and the resultant material laminated by pressing for forty-five minutes at 160° C. under 800 p.s.i. with the following results.

Water absorption of predried samples during 24 hours immersion in distilled water (A.S.T.M. D570–54T) percent:
- ⅛″ ............................................. 1.86
- ½″ ............................................. 1.01

Tensile strength (p.s.i.):
- M.D. ............................................. 21,500
- C.D. ............................................. 14,950

Flexural strength (p.s.i.):
- M.D. ............................................. 27,430
- C.D. ............................................. 19,100

M. of E. flex (p.s.i.×10⁶):
- M.D. ............................................. 1.82
- C.D. ............................................. 1.54

Compression strength flat (p.s.i.) ............... 41,210

Impact Izod (ft. lb./in. notch):
- M.D. ............................................. 1.04
- C.D. ............................................. 0.86

Bonding strength, lbs. (A.S.T.M. D229–49) steel ball ............................................. 915

Heat resistance: The material can be drawn hot from the press (160° C.) without blisters. Shows no surface injury and no blistering when subject to A.S.T.M. (D1300–53T) high temperature test.

What I claim is:

1. A method of producing a thermosetting laminating resin comprising forming the monomeric monomethylol derivative of acetone and formaldehyde in alkaline solution, reacting said derivative with phenol, and thereafter treating the phenol-modified derivative with water insoluble alkali lignin and additional formaldehyde to form the thermosetting resin.

2. A method according to claim 1 wherein the additional formaldehyde is reacted with the phenol-modified derivative to form the thermosetting resin and thereafter the lignin is dissolved in the resin.

References Cited in the file of this patent

UNITED STATES PATENTS

| | | |
|---|---|---|
| 2,501,666 | Evans | Mar. 28, 1950 |
| 2,629,703 | Vogelsong | Feb. 24, 1953 |
| 2,837,563 | Alles | June 3, 1958 |